US007472529B2

(12) United States Patent
Johnson et al.

(10) Patent No.: US 7,472,529 B2
(45) Date of Patent: Jan. 6, 2009

(54) SYSTEM FOR SEALING A PACKAGING WRAPPER

(75) Inventors: Steve Johnson, Webb City, MO (US); Richard Taylor, Diamond, MO (US); Curt Davis, Joplin, MO (US)

(73) Assignee: Tamko Roofing Products, Inc., Joplin, MO (US)

( * ) Notice: Subject to any disclaimer, the term of this patent is extended or adjusted under 35 U.S.C. 154(b) by 0 days.

(21) Appl. No.: 11/209,135

(22) Filed: Aug. 22, 2005

(65) Prior Publication Data

US 2006/0032194 A1 Feb. 16, 2006

Related U.S. Application Data

(62) Division of application No. 10/844,082, filed on May 12, 2004, now abandoned.

(51) Int. Cl.
*B65B 53/06* (2006.01)

(52) U.S. Cl. ............................ 53/557; 53/556; 53/441; 53/442

(58) Field of Classification Search .................. 53/557, 53/556, 441, 442, 376.6; 34/508, 509, 132, 34/604, 121, 136, 144; 432/11, 59
See application file for complete search history.

(56) References Cited

U.S. PATENT DOCUMENTS

| | | | | |
|---|---|---|---|---|
| 3,777,446 | A | 12/1973 | Graver | |
| 3,808,767 | A * | 5/1974 | Reid | 53/442 |
| 4,012,190 | A | 3/1977 | Dicks et al. | |
| 4,162,141 | A | 7/1979 | West | |
| 4,482,314 | A | 11/1984 | Giese et al. | |
| 4,555,895 | A | 12/1985 | Torre | |
| 4,602,556 | A * | 7/1986 | Gladden | 454/307 |
| 4,676,743 | A | 6/1987 | Ross | |
| 4,717,339 | A | 1/1988 | Kersting | |
| 4,894,104 | A | 1/1990 | Hemus | |
| 4,965,435 | A | 10/1990 | Smith et al. | |
| 5,027,948 | A | 7/1991 | Forbes et al. | |
| 5,301,929 | A | 4/1994 | Pflanz et al. | |
| 5,381,644 | A | 1/1995 | Di Bernardo | |
| 5,562,795 | A | 10/1996 | Landrum et al. | |
| 6,151,871 | A | 11/2000 | Torre | |
| 6,168,378 | B1 * | 1/2001 | Craw et al. | 415/211.2 |
| 6,848,834 | B1 | 2/2005 | Roehrs et al. | |

* cited by examiner

*Primary Examiner*—Hemant M Desai
(74) *Attorney, Agent, or Firm*—Husch Blackwell Sanders LLP

(57) ABSTRACT

A system for sealing a packaging wrapper around an object directs a flow of heated air to end flaps of the wrapper to move the end flaps into sealing contact with a body section of the wrapper to substantially enclose the object. The system includes an oven, a conveyor, a source of heated air and a means for deflecting the flow of heated air to the conveyor to seal end flaps of the wrapper with a body section of the wrapper. In use, an object surrounded by the wrapper body section is moved through the oven on a conveying surface of the conveyor, and heated air is moved through the oven bypassing the conveying surface to a region below the conveying surface. The heated air flow then encounters the means for deflecting the heated air flow, which directs the air flow upward and through the conveying surface to impact and move the end flaps into sealing contact with the wrapper body section.

2 Claims, 2 Drawing Sheets

SYSTEM FOR SEALING A PACKAGING WRAPPER

This application is a divisional application of previously filed U.S. application Ser. No. 10/844,082, filed May 12, 2004, now abandoned.

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

Roofing shingles are typically stacked together and packaged in a rectangular bundle for storage or shipping. Plastic wrap (e.g., nylon and polyethylene films, and combinations thereof) has become the packaging material of choice for bundling shingles because the plastic is water proof and has sufficient strength to maintain the integrity of the stacked bundle, while at the same time being easy to open to access the shingles.

In the conventional method of shingle packaging, a section of plastic wrap is folded around a shingle bundle and the wrapped bundle is sent through an oven on a conveyor. The oven is maintained at a temperature sufficient to cause the perimeter edges of the wrap that are folded over onto the remainder of the wrap to bond therewith and seal the shingle bundle within the wrap. In this process, it is often difficult to seal the wrap over opposed end portions of the shingle bundle. Even if a good seal is achieved, it is often results from the use of an excessive overlapping amount of plastic wrap, which increases the expense of shingle packaging and forms a more bulky packaged product.

It is therefore desirable to implement a shingle packaging solution where strong end seals are formed while only using the minimum amount of plastic wrap necessary. This will provide a reliable solution while keeping packaging material costs as low as possible.

BRIEF SUMMARY OF THE INVENTION

Accordingly, the present invention improves the coverage of a packaging wrapper around an object, such as a shingle bundle, by moving wrapper end flaps into contact with the body section of the wrapper and bonding the end flaps to the body section to form end seals. This results in less material usage as compared to conventional plastic wrapping methods while maintaining substantial, if not full, coverage of opposing end regions of the object.

In one aspect of the invention, a system is provided to seal a wrapper around an object. The system includes an oven, a conveyor, a source of heated air and a means for deflecting the flow of heated air to the conveyor to seal end flaps of the wrapper with a body section of the wrapper. As the object is moved through the oven on a conveying surface of the conveyor, heated air is moved through the oven bypassing the conveying surface to a region below the conveying surface. A set of dampers may be positioned adjacent to lateral side edges of the conveying surface to guide the heated air flow around the conveyor surface to the region below the conveying surface. At this point, the heated air flow encounters the means for deflecting the heated air flow, which directs the air flow upward and through the conveying surface to impact and move the end flaps into sealing contact with the wrapper body section.

In another aspect of the invention, an end seal deflector is provided to guide a flow of heated air to seal a wrapper to substantially enclose an object being moved through an oven on a surface of a conveyor. The end seal deflector is formed of a mounting member for mounting the deflector within the oven and a deflecting member extending at an angle from the mounting member. Heated air flowing to a region below the conveying surface encounters the deflecting member and is directed through the conveying surface to impact end flaps of the wrapper and move the same into sealing contact with a body section of the wrapper surrounding the object to form the sealed wrapper substantially enclosing the object.

DETAILED DESCRIPTION OF THE INVENTION

Figure 1:
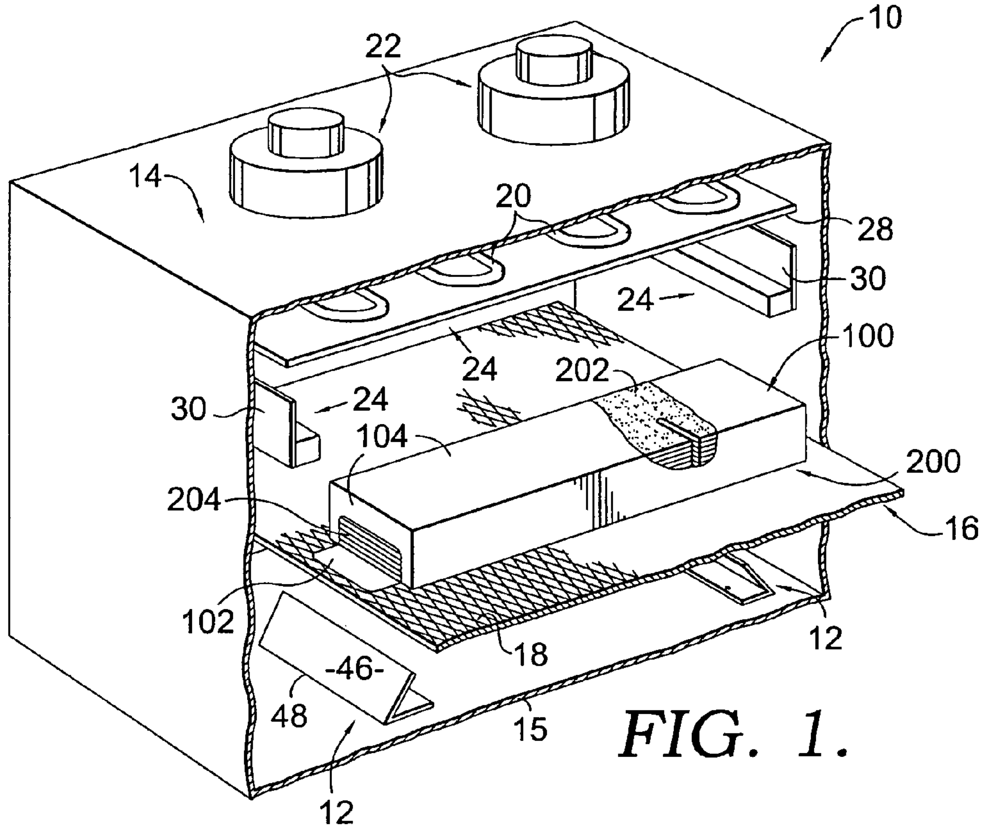
FIG. 1 is a perspective view of a wrapper sealing system showing the end seal deflectors.

With reference to FIG. 1, there is shown a system 10 for sealing a packaging wrapper 100 around an object 200 employing a set of end seal deflectors 12. The end seal deflectors 12 are configured to guide a flow of heated air to seal the packaging wrapper 100 by impacting opposed end seals or flaps 102 of the wrapper 100 and moving the end flaps 102 into sealing contact with a body section 104 of the wrapper 100 surrounding the object 200. The system 10 is ideally suited for use with packaging wrapper 100 that is formed in thin sheets out of plastics, such as nylon and polyethylene films, and combinations thereof. Additionally, while the present system 10 may be used to provide a wrapping a wide range of objects 200, the system 10 will be described herein as used to provide a packaging wrapper for a bundle of roofing shingles or the like serving as the object 200.

The system 10 includes an oven 14 through which the object 200 is moved on a conveyor 16 and a source of heated air flow which fluidly communicates heated air flow to a pair of the end seal deflectors 12. The conveyor 16 includes a conveying surface 18 upon which the partially wrapped shingle bundle 200 is placed for transporting the same through the oven 14. Preferably, the conveyor 16 is in the form of a conveyor chain that is porous to air flow.

Figure 2:
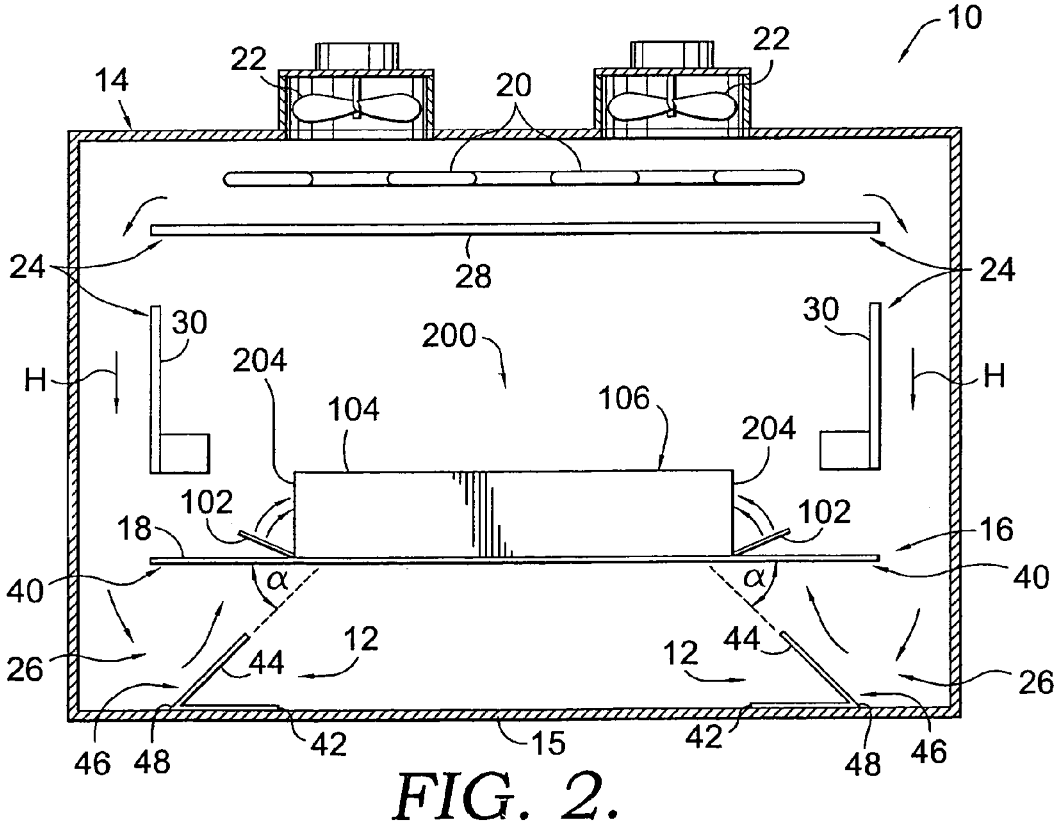
FIG. 2 is a perspective view of one end seal deflector.

In one exemplary arrangement shown in FIGS. 1 and 2, the source of heated air flow includes heating elements 20 positioned within the oven 14, oven fans 22 for forcing a flow of air over the heating elements 20 to generate a heated air flow, and dampers 24 to guide the heated air flow through the oven around the conveyor 16 to a region 26 below the conveying surface 18. This arrangement properly positions the heated air flow indicated by arrows H for deflection by the end seal deflectors 12 at an upward angle and preferably through the conveying surface 18 to impact the wrapper end flaps 102 and move the same into sealing contact with the wrapper body section 104. The temperature and mass flow rate of the heated air impacting the end flaps 102 should be sufficiently high, and for a sufficient amount of time, to cause wrapper bonding between the flaps 102 and the body section 104. Those of skill in the art will appreciate that such parameters (e.g., air flow temperature, mass flow rate, duration of air flow) are a matter of design choice based on the specific wrapper material chosen, size of the shingle bundles and the necessary end flaps, among other factors. The dampers 24 may include a first barrier 28 disposed below the heating elements and a set of lateral dampers 30 preferably positioned generally above and adjacent to lateral side edges 40 of the conveying surface 18. Dampers 24 served to initially deflect the heated air flow away from the conveying surface 18, and the lateral dampers 30 guide the air flow in the direction of arrows H to bypass the conveying surface 18 and reach the region 26 below the conveying surface 18. Other air flow pathways may be implemented with the present system 10 so long as a significant portion of the heated air flow avoids impacting the wrapper end flaps 102 from above, which could cause the flaps to bond or stick to the conveying surface 18.

Figure 3:
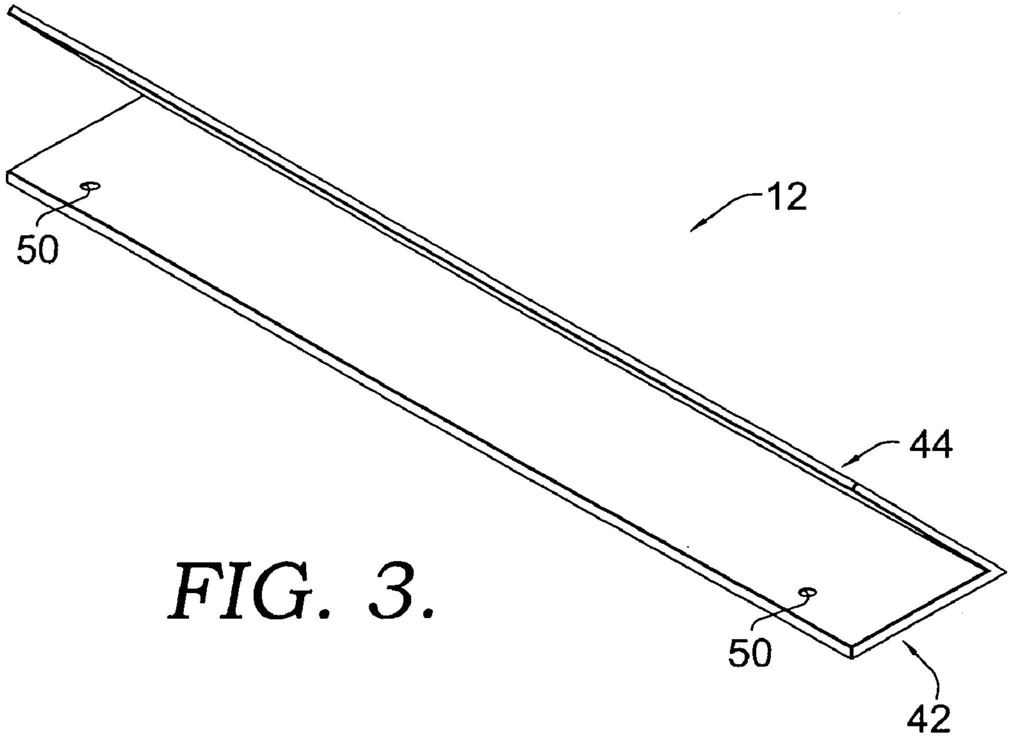
FIG. 3 is a side elevational view of the end seal deflector of FIG. 2.

The end seal deflectors 12 are positioned in the region 26 below the conveying surface 18 and receive the heated air flow guided by the dampers 24. As shown in FIG. 3, the deflector 12 comprise a mounting member 42 and a deflecting member 44 extending at an angle from the mounting member 42. The deflecting member 44 has an planar impacting surface 46 against which the heated air flow deflects to be directed upwards through the conveying surface 18. The deflector 12 may be formed of a single piece of sheet metal that is bent along a longitudinal edge 48 to form the mounting and deflecting members 42, 44; this edge 48 also is preferably aligned parallel with the longitudinal axis of the conveying surface 18 so that the impacting surface 46 is properly oriented to evenly distribute the heated air flow to the end flaps 102. The mounting member 42 may take the form of a first plate having various bores 50 to facilitate fasteners being inserted therethrough for attachment to an oven wall 15, and the deflecting member 44 may take the form of a second plate extending from the first plate at an angle of between about 30 and 60 degrees. Thus, each deflector 12 is generally V-shaped; however, other deflector shapes and angles between the mounting and deflecting members 42, 44, may be envisioned depending on the orientation of the surface to which the mounting member 42 is mounted (e.g., the oven wall 15) and the necessary angle of approach of heated air flow towards the wrapper end flaps 102 for impacting the flaps 102 and moving the same into sealing contact with the wrapper body section 104. For example, ideally the angle 0t formed by the intersection of a plane extending from impacting surface 46 and the plane of the conveying surface 18—measured counter-clockwise from the conveying surface—is about 30 to 60 degrees. The angle between the mounting and deflecting members 42, 44 is further dependent on the lateral positioning of the deflecting member 42 with respect to the wrapper end flaps 102 on the conveying surface 18.

The inventors have found that, in use with system 10, one effective end seal deflector 12 configuration is for the mounting member 44 to be about 8 inches in length (i.e., in the longitudinal direction of the conveying surface 18) and about 3 inches in width, the angle between the mounting and deflecting members 42, 44 to be around 45 degrees, and the overall height of the deflector 12 to be about 2 inches. Of course, these dimensions will depend on the air flow parameters that affect the bonding of the wrapper end flaps 102 with the wrapper body section 104 (e.g., air flow temperature, mass flow rate, duration of air flow, etc.). For example, the length of the deflecting member 42 may need to be longer or shorter than these exemplary dimensions depending on the speed at which the conveyor 16 moves the partially-wrapped shingle bundle 200 through the path of the heated air flow deflected by the deflector 12.

Figure 4:
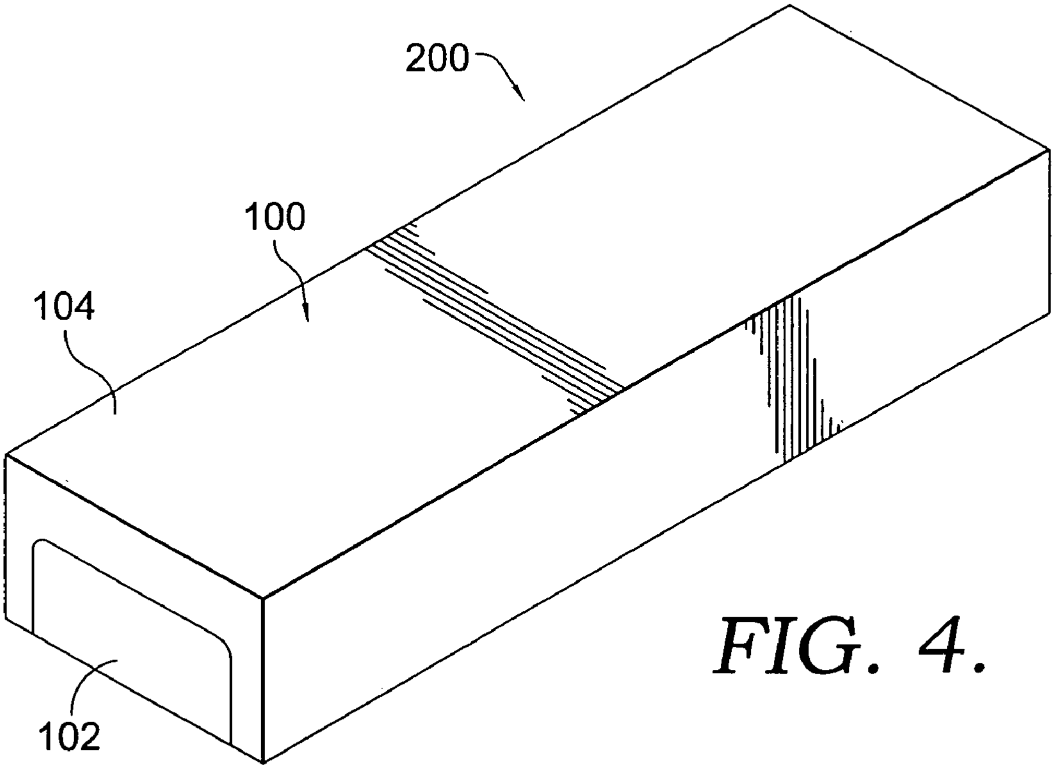
FIG. 4 is a perspective view of a bundle of shingles enclosed by a packaging wrapper.

In use of the system 10, the shingle bundle 200 enters the oven 14 on the conveyor 16 with the wrapper body section 104 surrounding a body portion 202 of the bundle 200 and opposing end portions 204 of the bundle remaining exposed, as seen in FIG. 1. At this point, opposed end flaps 102—extending from the wrapper body section 104 generally at a lower region 206 of the bundle end portions 204—lie on the on the conveying surface 18. The source of heated air directs the heated air flow to, the end seal deflectors 12, which deflect the air flow upward and through the conveying surface 18 to impact and fold the wrapper end flaps 102 upward as shown in FIG. 2. The heat air flow is sufficient to hold the end flaps 102 against the opposing end portions 204 of the shingle bundle 200 for a time period necessary for bonding to occur between the flaps and the portion of the wrapper body section 104 that is partially covering the bundle end portions 204. The shingle bundle 200 enclosed in the packaging wrapper 100 is then conveyed out of the oven 14, and upon cooling is in a form ready for shipping or storage, as seen in FIG. 4.

With this arrangement, implementation of the system of the present invention achieves a high quality packaging wrapper that is neat in appearance and easily formed using a conventional industrial oven for wrapper bonding. Since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A system for improving the end seal of a wrapped object, the object having a wrapper body surrounding the object with opposing end flaps extending from the body, the system comprising:

an oven;

a conveyor positioned in the oven and having a conveying surface operative to convey an object through the oven, the conveying surface configured to allow air flow therethrough;

a source of heated air for moving a volume of air through the oven bypassing the conveying surface to a region below the conveying surface; and means, positioned within the oven, for deflecting the heated air flow entering the region below the conveying surface upward and through the conveying surface to impact the opposing end flaps and move the flaps upward into substantially simultaneous sealing contact with the wrapper body.

2. The system of claim 1, wherein the conveying surface of the conveyor has opposing lateral side edges, and wherein the source of heated air comprises:

one or more heating elements;

one or more fans moving air over the one or more heating elements; and a set of dampers positioned adjacent to the lateral side edges of the conveying surface to guide the heated air flow around the conveyor surface to the region below the conveying surface.

* * * * *

UNITED STATES PATENT AND TRADEMARK OFFICE

CERTIFICATE OF CORRECTION

PATENT NO. : 7,472,529 B2
APPLICATION NO. : 11/209135
DATED : January 6, 2009
INVENTOR(S) : Steve Johnson It is certified that error appears in the above-identified patent and that said Letters Patent is hereby corrected as shown below:

Title page, Item (75) Inventors: delete "Curt Davis" and replace with "William C. Davis"

Signed and Sealed this

Twenty-fourth Day of February, 2009

JOHN DOLL
*Acting Director of the United States Patent and Trademark Office*